(12) United States Patent
Handa et al.

(10) Patent No.: US 6,738,200 B2
(45) Date of Patent: May 18, 2004

(54) PROJECTION LENS

(75) Inventors: Keishin Handa, Yokkaichi (JP);
Manabu Nishikawa, Yokkaichi (JP);
Yasunori Matsushita, Yokkaichi (JP);
Hiroyuki Watanabe, Kurashiki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/418,264

(22) Filed: Apr. 18, 2003

(65) Prior Publication Data
US 2003/0218807 A1 Nov. 27, 2003

Related U.S. Application Data

(63) Continuation of application No. PCT/JP01/09223, filed on Oct. 19, 2001.

(30) Foreign Application Priority Data

| Oct. 20, 2000 | (JP) | P. 2000-321152 |
| Oct. 31, 2000 | (JP) | P. 2000-333048 |
| Dec. 25, 2000 | (JP) | P. 2000-392419 |
| Mar. 13, 2001 | (JP) | P. 2001-070629 |

(51) Int. Cl.$^7$ ............... G02B 17/00; G02B 5/08; F21V 7/00
(52) U.S. Cl. ............... 359/727; 359/884; 362/347
(58) Field of Search ............... 359/727, 884; 353/37, 98; 362/347

(56) References Cited

U.S. PATENT DOCUMENTS 5,617,152 A * 4/1997 Stolov ............... 348/761
6,217,995 B1   4/2001 Handa

FOREIGN PATENT DOCUMENTS

| JP | 7-126505 | 5/1995 |
| JP | 9-96775 | 4/1997 |
| JP | 10-1538 | 1/1998 |
| JP | 10-1539 | 1/1998 |
| JP | 10-123491 | 5/1998 |
| JP | 10-123492 | 5/1998 |
| JP | 10-212346 | 8/1998 |
| JP | 11-72604 | 3/1999 |
| JP | 2000-147202 | 5/2000 |
| JP | 2000-171622 | 6/2000 |

* cited by examiner

*Primary Examiner*—David N. Spector
(74) *Attorney, Agent, or Firm*—Oblon, Spivak, McClelland, Maier & Neustadt, P.C.

(57) ABSTRACT

A subject for the invention is to provide a lens which is lightweight and inexpensive and, despite this, which is large and has a high-precision aspherical reflecting surface reduced in distortion.

The invention provides: a projection lens comprising a resin base having a given curved surface and a reflecting layer formed over the surface of the resin base, characterized in that the average of in-plane birefringent phase differences per unit thickness as measured with incident light from the direction perpendicular to the curved optical functional surface of the resin base is 30 nm/mm or less in a region accounting for at least 60% of the area of the optical functional surface; or a projection lens having a reflecting layer on an optical-function-imparted surface, wherein at least 60% of the optical-function-imparted surface has a surface roughness (Ra) of 200 Å or lower.

20 Claims, 4 Drawing Sheets

PROJECTION LENS

TECHNICAL FIELD

The present invention relates to a projection lens. More particularly, the invention relates to a projection lens which has a mirror (reflecting mirror) type resinous curved surface and is for use in high-precision high-resolution projection devices, especially rear-projection television receivers, and the like. This projection lens is applicable also to projection devices such as overhead projectors, window displays, and front-data projectors.

BACKGROUND

By far the most common materials for use as large optical parts required to have high precision, such as the projection lens mentioned above, have been glasses and metallic materials such as aluminum and steels. This is because optical parts having excellent optical precision are obtainable from such materials, in particular, images reduced in distortion are obtained even when temperature changes, and because such materials have high suitability for precision cutting/polishing.

However, use of glasses or metallic materials such as aluminum and steels as optical parts as described above poses the following problems.

First, in the case of using glass materials, expensive production equipment is necessary. Namely, since a glass is press-molded with heating, it is necessary to employ an apparatus having the function of evenly heating the glass to about 700° C. or higher for sufficiently melting the glass and to use a mold having high shape precision even under high-temperature compression and further having durability. Furthermore, a prolonged cycle time is necessary when heating/cooling time is taken into account, and this results in low productivity and an exceedingly high product cost. Because of these, glass parts for projection devices are usable only in highly special applications where high costs are acceptable, and have not spread to general office use or domestic use.

Next, in the case of using metallic materials such as aluminum and steels, it is basically necessary to produce optical parts through precise cutting and polishing for each part. Because of this, the parts themselves are considerably expensive in this case also and unsuitable for mass production.

It is hence expected to use resin materials which are relatively easy to mold, in place of glasses or metallic materials such as aluminum and steels. However, ordinary injection-molded products or compression-molded products formed from thermoplastic resins suffer considerable molding shrinkage and have warpage, sink marks, or failures concerning shape (curved surface) transfer from the mold. Because of this, it is difficult to obtain a molded product, such as a projection lens, which has a large size (large area and large thickness) and high shape precision so as to obtain high-resolution image quality.

On the other hand, in the case where a resin curing with heat or light, such as an epoxy or diacrylate resin, is used as a feed material, cure shrinkage occurs to pose a problem that the molded product suffers deformation, distortion, and the like due to the shrinkage as in the case of thermoplastic resins. In addition, use of such curable resins has a problem that since it necessitates a prolonged time period of from several hours to tens of hours for curing or for annealing (curing acceleration, crosslink density improvement, and relaxation of residual stress) after initial cure, it is unsuitable for mass production.

DISCLOSURE OF THE INVENTION

The present inventors made intensive investigations in view of the problems described above. As a result, they have found that even when a resin is used as a feed material, a resin base having a high-precision reflecting surface reduced in distortion can be obtained by directing attention to a specific property and selecting a resin material so that the value of this property is within a specific range, and by controlling molding conditions. They have further found that a high-performance projection lens can be obtained by using the resin base. The invention has been thus completed. Namely, an essential aspect of the invention relates to a projection lens comprising a resin base having a given curved surface and a reflecting layer formed over the surface of the resin base, characterized in that the average of in-plane birefringent phase differences per unit thickness as measured with incident light from the direction perpendicular to the curved optical functional surface of the resin base is 30 nm/mm or less in a region accounting for at least 60% of the area of the optical functional surface.

Figure 1:
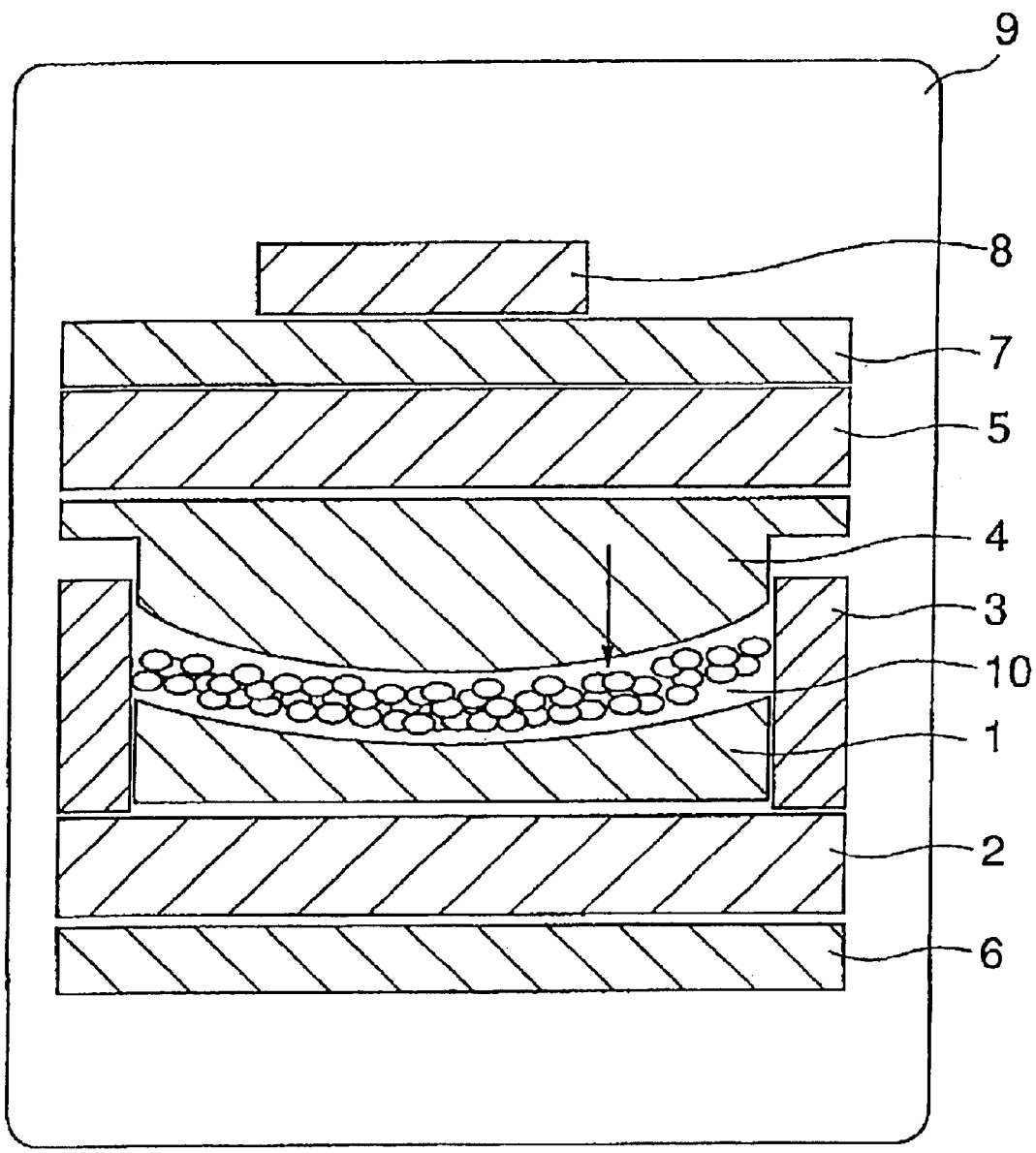
FIG. 1 is a vertical sectional view of one example of molds for use in molding a projection lens by the process of the invention.

In the figures, numeral 1 denotes a mirror-surface die, 2 a heater, 3 a frame, 4 a back-side die, 5 a heater, 6 a cooler, 7 a cooler, 8 a load, 9 a vacuum heating chamber, 10 a resin base, Z a coordinate on the axis of rotation symmetry of an aspherical surface with the center of the aspherical surface at the origin, and h a distance coordinate extending in directions perpendicular to the axis of rotation symmetry of the aspherical surface with the center of the aspherical surface at the origin.

BEST MODE FOR CARRYING OUT THE INVENTION

The invention will be explained below in detail.
(Shape and Properties of Projection Lens)

The projection lens of the invention is a projection lens comprising a resin base having a given curved surface and a reflecting layer formed over the surface of the resin base. Excellent properties of this projection lens reside especially in properties of the resin base, which has been precisely molded. The most characteristic feature resides in that the average of in-plane birefringent phase differences per unit thickness as measured with incident light from the direction perpendicular to the curved optical functional surface of the resin base is 30 nm/mm or less, preferably 20 nm/mm or less, more preferably 10 nm/mm or less, most preferably 5 nm/mm or less, in a region including a central part of the optical functional surface and accounting for at least 60%, preferably 70%, more preferably 80%, of the functional surface. The term optical functional surface herein means the part (surface) in which the presence of a distortion is optically undesirable and which has a particular function of an optical part. Consequently, although there are cases where a part not required to perform an optical function is formed around the periphery of the optical functional surface according to necessity for production, such an edge part is not included in the optical functional surface. Furthermore, the term central part of the optical functional surface means a central part in a planar view of the surface. By forming the resin base so that the in-plane birefringent phase difference in a central-part-including area accounting for at least 60% of the optical functional surface is within that range, the desired projection lens is obtained.

In the case of projection lenses, when a high projection magnification is used, a distortion in the lenses directly results in an image distortion enlarged accordingly. It is therefore necessary to provide a composition extremely reduced in distortion attributable to shrinkage during melt molding, etc. In addition, since the roughness of the reflecting surface not only is enlarged in the projected image but also results in irregular reflection, it is necessary to avoid a decrease and unevenness of image brightness caused by the irregular reflection. It is therefore preferred that the base be one in which the surface where an optical functional surface is to be formed is an extremely smooth mirror surface. Consequently, the projection lens of the invention is based on a resin base in which a region including a central part of the optical functional surface and accounting for at least 60%, preferably 70%, more preferably 80%, of the functional surface has a surface roughness (Ra) of preferably 200 Å or lower, although the surface roughness depends on the mirror-smooth state of the die used for molding and on the base molded.

The projection lens of the invention described above is not particularly limited in size. However, it is intended to be applied mainly to relatively large products. It is a matter of course that prevention of optical distortions and molding are more difficult in large (large area and large thickness) optical products than in small optical parts. Assuming that the precision of projection lens installation position is within a practical range for practical devices, the specific dimensions of the projection lens to be obtained in the invention are usually such that the plane area is 150 cm$^2$ or larger, the minimum plane width is 10 cm or larger, and the thickness is 3 mm or larger.

In the case of large projection type image devices such as those having a screen size exceeding 30 inches, the projection lens is strictly required to have shape precision. For obtaining a projected image giving no unnatural feeling, each pixel region on the lens desirably has smaller shape fluctuations in the direction perpendicular to the plane. For coping with this subject, in the projection lens of the invention, the resin base is one in which the optical functional surface as a whole has reduced shape fluctuations, which usually are in the range of ±50 μm, especially ±30 μm, based on the average thickness of the resin base. In case where the optical functional surface as a whole has shape fluctuations outside that range due to warpage, sink marks, or the like, the image sags or deforms to give an unnatural feeling. In case where the shape fluctuations exceed such a degree, the pixels on the screen have a shape deformed from their original one. In extreme cases, a pixel is divided into several units to form images on the screen. In the case of a large lens of the type with which an image is projected on a large screen of 30 inches or more at an enlargement of about 20 magnifications, the size of each pixel on the lens usually has a width of about from several millimeters to 1 cm.

(Base Resin)

The resin constituting the base of the projection lens of the invention usually is a thermoplastic resin. In particular, an amorphous thermoplastic resin is preferred because it is less susceptible to molding shrinkage. The degree of crystallinity of the resin base constituting the projection lens of the invention is generally 20% or lower, preferably 15% or lower, especially preferably 10% or lower. Higher degrees of crystallinity are undesirable in that not only a considerable density change occurs but also the difference in density between the crystalline part and the amorphous phase part may yield fine irregularities or the like having an optically unnegligible size (e.g., having a level difference not smaller than one-fourth the wavelength in 1 mm-square area) on the molding surface, resulting in reduced shape precision.

The resin constituting the base of the projection lens of the invention preferably is one having a high glass transition temperature (Tg). This is because it is necessary that the lens, as a part for domestic or office devices, should secure image quality usually up to 60° C. In order for an optical part not to deform at 60° C. with certainty, the Tg of the resin is preferably 80° C. or higher, more preferably 100° C. or higher, in the case of an amorphous thermoplastic resin material.

Furthermore, a feed resin having low hygroscopicity is desirable. The saturation water absorption of the resin at 60° C. and 90 RH % is generally 1 wt % or lower, preferably 0.5 wt % or lower. The reason for the necessity of low hygroscopicity is as follows. The projection lens of the invention, which has a reflecting layer made of a metal, e.g., aluminum, formed on a surface of the base, is considerably large and thick among optical parts. In addition, almost no water absorption occurs on the reflecting layer side, i.e., the metal layer side. Because of these and others, when water absorption occurs on one side (the side opposite to the reflecting layer), an expansion deformation occurs and the shape changes to reduce optical precision. This decrease in optical precision may cause blurring or an image deformation.

The kind of the feed resin is not particularly limited as long as it is a resin having those properties. However, examples thereof generally include acrylic resins such as poly(methyl methacrylate), polycarbonate resins, polyester carbonate resins, aromatic polyester resins, polysulfone resins, polyethersulfone resins, styrol resins such as polystyrene and acrylic/styrene copolymers, cyclic polyolefin resins, and the like. It is generally preferred to use a polycarbonate resin because it combines moldability, strength, profitability (material cost), etc.

A preferred polycarbonate for use as the base resin in the invention has a viscosity-average molecular weight of generally from 18,000 to 25,000, preferably from 20,000 to 23,000. In the case of a polycarbonate having a molecular weight lower than 18,000, there are possibilities that the molded plate might crack when a heat shock is applied thereto (when the molded plate repeatedly or abruptly undergoes heating and cooling during use), and that when the molded plate is cooled after having been taken out of the mold during molding, it might suffer a volume distortion due to a temperature difference between inner parts and the surface and crack. On the other hand, in the case of a polycarbonate having a molecular weight exceeding 25,000, the viscosity thereof is so high that the diminution of orientation of molecular chains, which is necessary for precisely transferring the mirror surface or for inhibiting the molded product from warping/deforming, is insufficient at such a low molding temperature as not to cause thermal deterioration. As a result, a prolonged molding time is necessary. Use of such a polycarbonate is hence industrially disadvantageous.

The polycarbonate to be used in the invention has a terminal OH (hydroxy group) amount of generally 700 ppm or smaller, preferably 500 ppm or smaller, especially preferably 250 ppm or smaller. When the terminal OH amount exceeds 700 ppm, there may be a problem that after hot pressing, the polycarbonate resin shows tenacious adhesion to the mirror surface of the mold and the molded product is difficult to release from the mold.

(Additive Ingredients for Base Resin)

When a resin base for the projection lens is molded by a technique such as press molding or injection molding, a constant volume is maintained and the pressure of resin expansion is utilized for molding. Although it is necessary to elevate the resin temperature for increasing the degree of expansion of the resin, there are limitations on temperature elevation when the thermal stability of the resin is taken into account. Even when the degree of expansion is actually increased to thereby heighten the degree of contact of the resin with the supermirror surface, the separation of the molded product from the supermirror-surface stamper necessitates an increased release force because of the increased degree of contact and this may cause the molded product to crack or deform during the mold release. In particular, as the area of the surface to be separated from the mold (in this case, the effective optical functional surface in contact with the supermirror surface) increases, the release force becomes larger to pose a problem concerning shape precision. A release agent, heat stabilizer, ultraviolet absorber, and the like can hence be added to the feed resin in order to overcome such a problem.

Examples of the release agent include fatty acid esters (wholly esterified compounds and partly esterified compounds) such as glycerol fatty acid esters, sorbitan fatty acid esters, propylene glycol fatty acid esters, and higher-alcohol fatty acid esters, silicones, and the like. However, glycerol fatty acid esters are preferred. The amount of the release agent to be used is generally from 30 to 3,000 ppm, preferably from 100 to 2,500 ppm, of the feed resin. The release agent migrates to the interface with the mold during molding and facilitates the release of the molded product from the mold. When the amount of the release agent added is small, there are cases where release failures occur in releasing the molded product from the mold to pose problems such as breakage, deformation, and surface damage. In case where the amount of the release agent added is large, the following problem may arise. When a reflecting layer is formed on a surface of the base by sputtering or the like, the reflecting layer may have poor adhesion or poor durability. Specifically, the release agent migrates to the interface between the molded product and the reflecting film just after the molding or with the lapse of time to pose problems such as peeling of the reflecting film.

Examples of the heat stabilizer include phenol compounds such as 2,6-di-t-butyl-p-cresol, 2,6-di-t-butyl-4-hydroxymethylphenol, 2,6-di-t-butyl-4-ethylphenol, 2,4,6-tri-t-butylphenol, butylated hydroxyanisole, cyclohexylphenol, styrenated phenol, 2,5-di-t-butylhydroquinone, n-octadecyl 3-(3',5'-di-t-butyl-4'-hydroxyphenyl)propionate, 2,2'-methylenebis(4-methyl-6-t-butylphenol), 4,4'-isopropylidenebisphenol, 4,4'-methylenebis(2,6-di-t-butylphenol), 1,1-bis(4'-hydroxyphenyl)cyclohexane, 2,2'-thiobis(4-methyl-6-t-butylphenol), and 1,1,3-tris(2'-methyl-4'-hydroxy-5'-t-butylphenyl)butane; amine compounds such as aldol-α-naphthylamine, phenyl-α-naphthylamine, phenyl-β-naphthylamine, N,N'-diphenyl-p-phenylenediamine, and 1,2-dihydro-2,2,4-trimethylquinoline; sulfur compounds such as dilauryl thiodipropionate, dimyristyl thiodipropionate, and distearyl thiodipropionate; phosphorus compounds such as triphenyl phosphite, diphenyl isodecyl phosphite, phenyl diisodecyl phosphite, tris (nonylphenyl) phosphite, tris(mono- and dinonylphenyl) phosphites, 4,4'-butylidenebis(3-methyl-6-t-butylphenyl) ditridecyl phosphite, distearylpentaerythritol diphosphite, trilauryl trithiophosphite, trioctadecyl phosphite, o-cyclohexylphenyl phosphite, diisodecylpentaerythritol diphosphite, dinonylphenylpentaerythritol diphosphite, tetraphenyl dipropylene glycol diphosphite, tris(2,4-di-t-butylphenyl) phosphite, 4,4'-isopropylidenediphenyl tetraalkyl phosphites, 4,4'-isopropylidenebis(3-methyl-6-t-butylphenyl) ditridecyl phosphite, 1,1,3-tris(2'-methyl-4'-ditridecyl phosphite, 1,1,3-tris(2'-methyl-4'-ditridecyl -phosphite-5'-t-butylphenyl)butane, and poly(dipropylene glycol) phenyl phosphite; phosphaphenanthrene compounds such as 9,10-dihydro-9-oxa-10-phosphaphenanthrene 10-oxide, 10-decyloxy-9,10-dihydro-9-oxa-10-phosphaphenanthrene, and 10-(3',5'-di-t-butyl-4-hydroxybenzyl)-9,10-dihydro-9-oxa-10-phosphaphenanthrene 10-oxide; and the like.

The amount of the heat stabilizer to be used is generally from 100 to 1,000 ppm, preferably from 300 to 800 ppm, of the feed resin. The heat stabilizer prevents the resin from decomposing and, as a result, facilitates release from the mold. When the amount of the heat stabilizer added is small, there are cases where the effect of preventing resin oxidation during molding is low and the oxidized resin and the like enhance adhesion to the mold to raise difficulties in releasing the molded product from the mold. Even when the heat stabilizer is added in a large amount, the oxidation-preventive effect is not heightened any more and no improvement in the improving effect is expected. In addition, when an antioxidant is present in a high concentration, it functions as a catalyst for resin hydrolysis. Because of this, in the case of a polycarbonate resin, for example, the polycarbonate resin hydrolyzes to thereby generate phenolic OH groups at molecular ends thereof. Since phenolic OH groups tenaciously adhere to the mirror surface of the mold, the molded product shows poor releasability from the mold as stated above. As a result, there are cases where the molded product has a surface damage or the molding cycle requires a prolonged time.

Examples of the ultraviolet absorber include benzotriazole compound ultraviolet absorbers, triazine compound ultraviolet absorbers, benzophenone compound ultraviolet absorbers, benzoate light stabilizers, hindered-amine light stabilizers, and the like. Examples of the benzotriazole compound ultraviolet absorbers include 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-t-butylphenol, and 2-[5-chloro(2H)-benzotriazol-2-yl]-4-methyl-6-(t-butyl)phenol. Examples of the triazine compound ultraviolet absorbers include 2-(4,6-diphenyl-1,3,5-triazin-2-yl)-5-[(hexyl)oxy]phenol. Examples of the benzophenone compound ultraviolet absorbers include octabenzone. Examples of the benzoate light stabilizers include 2,4-di-t-butyl-4-hydroxybenzoates and the like. The amount of these ultraviolet absorbers to be incorporated is generally about from 10 to 2,000 ppm of the resin.

(Method of Molding Projection Lens Base)

The base of the projection lens of the invention is obtained by heating and melting the base resin described above and pressing the melt against the mirror surface part of a mold at a high pressure. Examples of molding techniques applicable to this method include the gate sealing method, remelting molding method, and the like. In these molding techniques, a resin preform is charged (fitted) into the cavity of a mold and heated to a temperature not lower than the glass transition temperature thereof to thereby cause the preform to expand within the cavity and be pressed against the mirror surface part of the mold by the expansion force. The mirror surface is thus transferred. There also is a technique in which the whole mold is placed in a vacuum chamber and heated in order to further improve mirror surface transferability, whereby the expansion of the resin or perform in the cavity is accelerated and the pressure for pressing against the mirror surface is increased. These techniques are common with each other in that a resin is molded by pressing the resin which is in a molten state or heated to a temperature not lower than the heat deformation temperature thereof against the mirror surface part of a mold.

When a molded product has warpage, sink marks, or the like, this base resin poses problems, for example, that originally straight line images bend, even if the mirror surface part has excellent smoothness. For avoiding this, it is important to regulate a cooling step. In a cooling step, the resin is held for a certain time period at a temperature higher than the glass transition point thereof to thereby relax the stress in the material, and is then cooled to a temperature not higher than the glass transition point, preferably to a temperature as close to room temperature as possible, before the molded product is taken out of the mold. The molded product, i.e., resin base, obtained by such a method has extremely small in-plane birefringent phase differences per unit thickness in the region corresponding to the curved part (optical functional surface) of the lens, as measured with incident light from the direction perpendicular to the optical functional surface of the resin base. Specifically, the base has a birefringence of 30 nm/mm or lower in a region including a central part of the optical functional surface and accounting for at least 60% of the functional surface.

A specific molding method for obtaining such a base will be explained.

Figure 2:
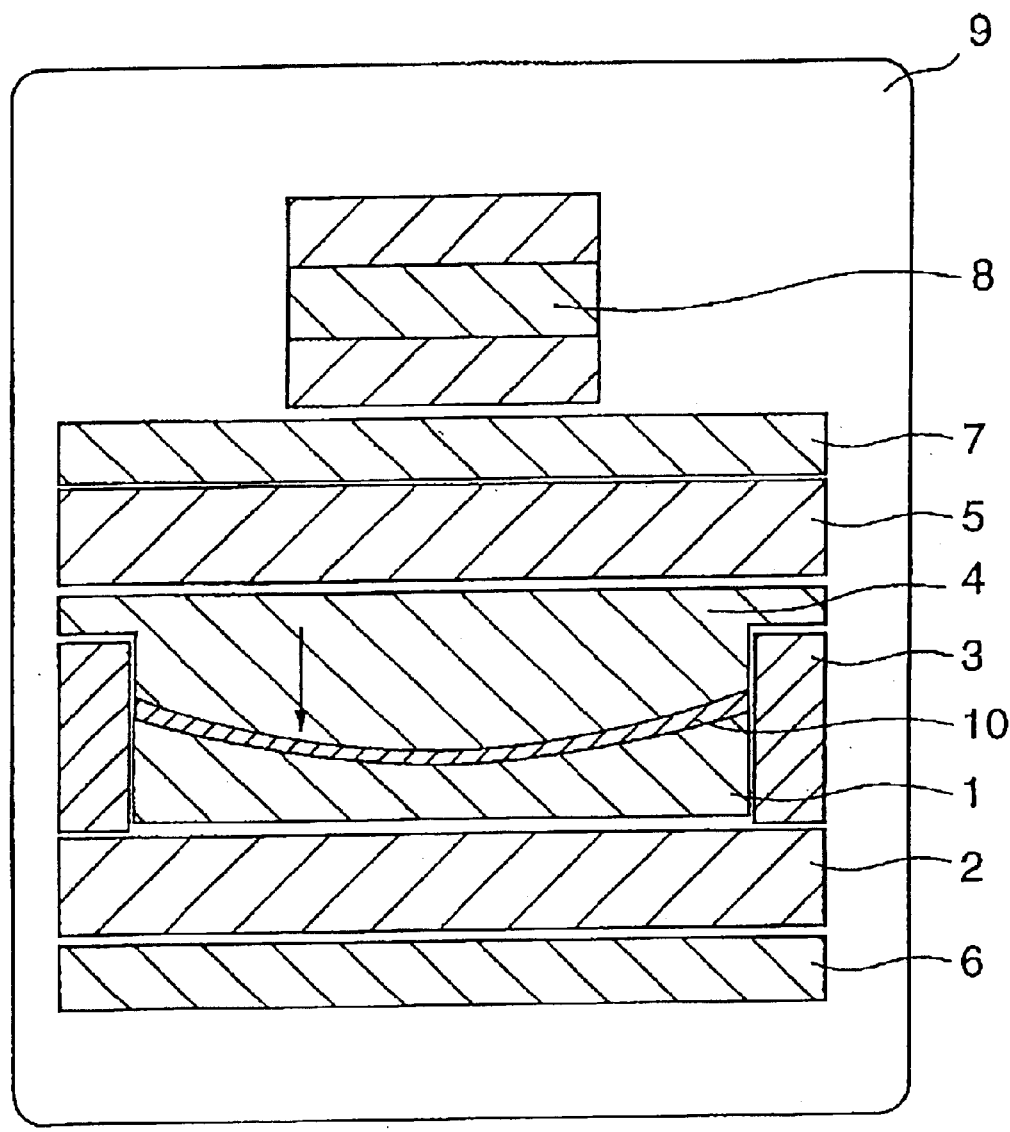
FIG. 2 is a vertical sectional view of one example of molds for use in molding a projection lens by the process of the invention.

FIG. 1 and FIG. 2 are vertical sectional views of one example of molds for use in molding a projection lens by the process of the invention. In the figures, 1 denotes a mirror-surface die, 2 a heater, 3 a frame, 4 a back-side die, 5 a heater, 6 and 7 a cooler, 8 a load, 9 a vacuum heating chamber, and 10 a resin base.

An example of steps in the projection lens production process of the invention is explained. A heater 2 and a mirror-surface die 1 are disposed on a cooler 6, and a frame 3 is disposed around the mirror-surface die 1. These molding units are placed in a vacuum heating chamber 9, and the heater 2 is set at a temperature higher by from 10 to 20° C. than the glass transition point of the thermoplastic resin to be used. The surface of the die 1 may be preheated to around a temperature in the range of from the Tg of the thermoplastic resin to Tg−30° C. After completion of the preheating, pellets or a prepreg of a thermoplastic resin for forming a base 10 is placed on the die 1. The pellets are closely spread so that the pellet layer as a whole has an almost even thickness. The prepreg preferably is one having a thickness larger by about 3 to 20% than the thickness of the lens to be obtained.

The projection lens desirably has an almost even thickness throughout so as to be prevented from warping or deforming. Namely, the thickness of the resin base in its part corresponding to the reflecting surface of the projection lens is desirably within ±50% based on the average thickness of the resin base. When a product has considerably different thicknesses, warpage or a deformation occurs frequently because a shrinkage stress generates unevenly during cooling. Although a rib may be formed around the lens for the purpose of reinforcement, the thickness of the ribbed part in this case is excluded in calculating the average thickness. The degree of vacuum is-preferably in the range of from −60 kPa to −102 kP based on atmospheric pressure. In case where the degree of vacuum is too high, there is the possibility that air bubbles might remain in the molded product and the shape/warpage of the molded product as a whole might change with ambient temperature, resulting in reduced optical-part precision. Furthermore, there are cases where the resin does not sufficiently fill edge parts of the molded product, e.g., edge parts such as tongue-shaped fitting parts for attachment to an external instrument to be disposed around the molded product, resulting in a molded product with incomplete edge parts. The resin material is heated to a temperature higher than the Tg thereof generally by from 30 to 100° C., preferably by from 70 to 90° C., and held until the temperature becomes constant. After the inner parts of the material come into a sufficiently molten state, a back-side die 4, heater 5, and cooler 7 are set. A load 8 of from 10 to 50 kg is applied to the mold assembly in this state. The total weight including the weight of the back-side die 4 is generally from 20 to 60 kg. By putting the back-side die 4 and placing the load 8, a back-side shape is formed. In case where the back-side surface has irregularities or bubble inclusions, the thicknesses of the respective parts fluctuate and, hence, shape precision cannot be obtained as stated above. A proper pressure range is generally from 1 to 10,000 kPa, preferably from 2 to 2,000 kPa, more preferably from 4 to 1,000 kPa. In case where the pressure is lower than that, the formation of a back-side shape is insufficient. In case where the pressure exceeds that, the relaxation of molecular chain orientation is insufficient and this may cause the molded product to warp or deform. The time period of holding with heating is generally from 1 to 100 minutes, preferably from 5 to 60 minutes, more preferably from 10 to 40 minutes. It is preferred that after initiation of the heating, the heater 2, which is the lower one of the heaters 2 and 5, be regulated so as to have a temperature higher by about from 20 to 120° C. than the temperature of the heater 5, which is the upper one. This operation is expected to be effective in inhibiting air bubbles from residing in inner parts of the resin base 10, especially on the mirror-surface side facing the mirror-surface die 1. Finally, the heaters 2 and 5 preferably are regulated so as to have almost the same temperature which is higher than the Tg by about from 50 to 120° C. and are held for about from 5 to 30 minutes.

Subsequently, an inert gas is introduced into the vacuum heating chamber 9 which has had a reduced pressure, while maintaining the heated state. Thus, the internal pressure is elevated to around atmospheric pressure. The gas to be used for this pressure recovery desirably is an inert gas such as nitrogen. The oxygen concentration in the inert gas is generally lower than 10 vol %, preferably lower than 5 vol %, more preferably lower than 2 vol %. High oxygen contents are undesirable in that there are cases where the resin surface is oxidatively deteriorated to cause mold release failures and molding surface damages.

After the pressure recovery, a cooling operation is initiated to relax resin orientation and impart low birefringence.

A coolant such as cooling water is caused to flow through the coolers 6 and 7, and the heaters 2 and 5 are set at a lowered temperature which is in the range of about from the Tg to Tg+30° C. At this temperature, the resin is held for about from 10 to 40 minutes. The temperature is then lowered by 10 to 50° C. and the resin is held for about from 10 to 40 minutes. Thereafter, the temperatures of the heater platens are lowered to below the Tg over about from 10 to 40 minutes. In this manner, the temperature of the molded product is lowered exceedingly slowly. In general, the molded article is cooled at a rate of from 0.5 to 5° C./min. The rate of cooling through the Tg, preferably cooling in the range of from Tg+10° C. to Tg−10° C., more preferably cooling in the range of from Tg+15° C. to Tg−15° C., is generally not higher than (30° C./min)/(average molded-product thickness (mm)), preferably not higher than (20° C./min)/(average molded-product thickness (mm)), more preferably not higher than (10° C./min)/(average molded-product thickness (mm)), most preferably not higher than (5° C./min)/(average molded-product thickness (mm)), in terms of the rate of cooling of the molded-product surface. In case where cooling is conducted at a rate higher than that cooling rate, a temperature distribution generates inside and this is accompanied by the generation of an internal stress and reorientation. As a result, warpage, deformation, and sink marks generate to reduce shape precision. This phenomenon becomes more conspicuous as the thickness and size of the molded product increase.

The reasons why cooling around the Tg is especially important are that since the resin shows a considerably large volume change upon cooling through the Tg and the movement of molecular chains is fixed at temperatures lower than the Tg, cooling around the Tg exerts especially considerable influences on shape precision concerning warpage, deformation, sink marks, etc. In case where too high a pressure is used during this cooling, orientation is less apt to be relaxed. Consequently, the pressure during the cooling is in the range of generally from 1 to 10,000 kPa, preferably from 2 to 2,000 kPa, more preferably from 4 to 1,000 kPa, per area of the molded product. Too low pressures may result in insufficient transfer of the mirror surface. The base which has been thus cooled slowly under a given pressure is taken out of the mold.

(Reflecting Layer)

A reflecting layer comprising a vapor-deposited metal film or the like is formed on a surface of the base taken out of the mold. In this case, the term vapor deposition is used not in a narrow sense but in a wide sense, and means deposition techniques including sputtering, reactive sputtering, and the like. Usually, the base is cleaned prior to vapor deposition. Base cleaning before vapor deposition is conducted for the purpose of removing the fats adherent to the surface and the additives which have bled out and are adherent thereto to thereby obtain, through the vapor deposition of a reflecting film, an appearance free from defects such as spots or dulling and improve adhesion of the reflecting film. The cleaning may be accomplished by immersing the base in a cleaning liquid at ordinary temperature for about from 10 to 120 seconds. It is preferred that during the immersion, ultrasonic be directly applied to the optical functional surface of the base in order to efficiently and evenly clean the surface. Preferred cleaning liquids are fluorocarbon detergents, nonaqueous hydrocarbon solvents, and alcohol-based cleaning liquids. A preferred drying method comprises drying the base with the vapor of the detergent used and then further drying it in a vacuum dryer.

Conditions for vapor deposition are as follows. After having been dried, the base is placed in a film deposition apparatus and the degree of vacuum is elevated to $1\times10^{-4}$ to $1\times10^{-6}$ kPa. Usually, an anchor coat (undercoat layer), a reflecting layer, and a protective layer are formed in this order from the mirror surface side of the molded product.

Examples of the anchor coat include metals or metal oxides such as chromium (Cr), nickel (Ni), silicon oxides ($SiO_2$ and SiO), and aluminum oxide ($AL_2O_3$). However, silicon oxides are preferred in that adhesion to the base and a satisfactory appearance are obtained therewith. The thickness of the anchor coat is preferably from 30 to 1,500 Å. In case where the thickness thereof is smaller than 30 Å, pinholes are apt to be formed and there is the possibility of impaired adhesion to the base. In case where the thickness thereof exceeds 1,500 Å, the anchor coat film is apt to crack due to a difference in linear expansion coefficient between the anchor coat and the resin base.

As the reflecting layer is used aluminum (Al), silver (Ag), or the like as stated above. However, aluminum is preferred from the standpoints of reflectance, durability, and cost. The thickness of the reflecting layer is preferably from 500 to 3,000 Å. Thicknesses thereof smaller than 500 Å tend to result in a reflectance as low as 70% or below. In case where the thickness thereof exceeds 3,000 Å, there is the possibility of cracking.

A transparent protective layer is desirably formed on the reflecting layer. Usually, silicon oxide ($SiO_2$ or SiO) is used. The thickness of the protective layer is generally from 30 to 2,000 Å, preferably from 700 to 1,500 Å. In case where the protective layer is thin, pinholes are apt to be formed and this protective layer cannot intercept the oxygen or water present in the air. As a result, the reflecting layer is oxidized to cause a decrease in reflectance. In case where the protective layer is too thick, not only the film is apt to crack due to a difference in linear expansion coefficient between the protective layer and the resin base, but also the reflectance decreases. For the purpose of elevating the reflectance, a film of titanium oxide (TiO, $TiO_2$) may be deposited as a reflection-enhancing film between the protective layer and the reflecting layer. In this case, the thickness of the reflection-enhancing film is generally from 5 to 1,000 Å.

Reflectance in the visible light region desirably is as high as possible. However, from the standpoint of effectively utilizing the quantity of light from a light source, the reflectance is generally 70% or higher, preferably 80% or higher, more preferably 90% or higher, in terms of average value for the visible light region. In this connection, the theoretical reflectance of aluminum is about 93% in terms of average value for the visible light region. Reflectance measurement is generally difficult on aspherical shapes. Consequently, film deposition on a flat monitor glass is conducted simultaneously with film deposition on the molded resin base, and this glass plate is examined for evaluation.

Incidentally, the projection lens of the invention can give highly satisfactory images when it satisfies the following relationship, wherein R1 is the average reflectance of light having wavelengths of from 400 to 550 nm on the reflecting surface and R2 is the average reflectance of light having wavelengths of from longer than 550 nm to 700 nm on the reflecting surface. The lens can be made to meet this requirement by regulating the reflecting surface within the constitutional range shown above.

$$R1 > R2 > 70\%$$

R1 and R2 can be determined using the following equations.

$$R1 = (\sum_{n=1}^{k} R\lambda n)/k \quad (400 \leq \lambda n \leq 550)$$

$$R2 = (\sum_{n=1}^{k} R\lambda n)/k \quad (550 < \lambda n \leq 700)$$

In the equations, k is the number of points of measurement and

Rλn is absolute reflectance at λn.

Figure 4:
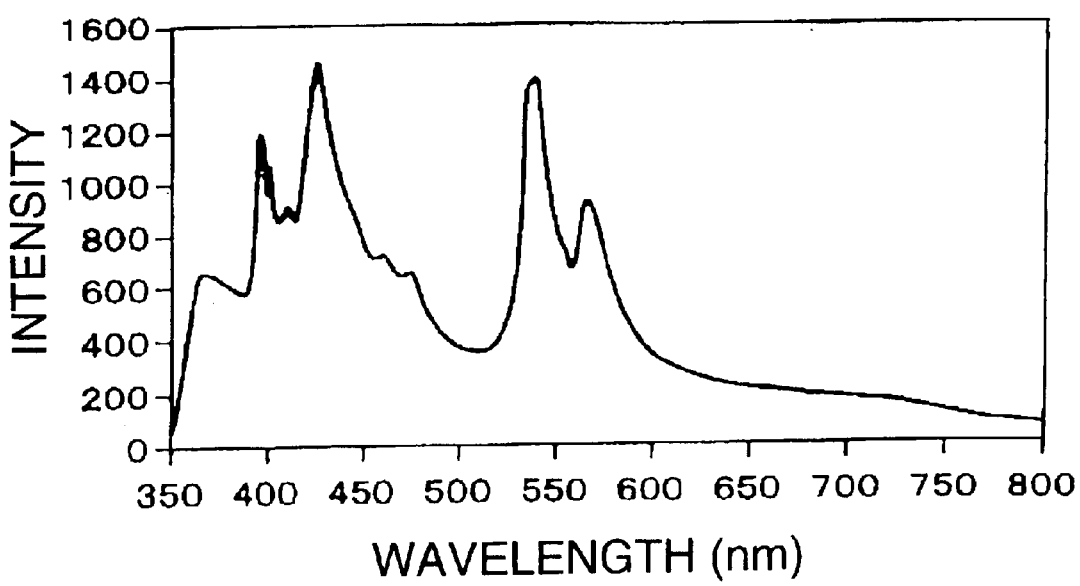
FIG. 4 is a graph showing an emission spectrum for an extra-high-pressure mercury lamp.

In general, displays and projectors employing a projection lens, a metal halide light is used as a light source. Recently, use of an extra-high-pressure mercury lamp is being investigated. However, metal halide lamps and extra-high-pressure mercury lamps show an emission spectrum which has large peaks at wavelengths of around 430 nm and around 550 nm, as shown in FIG. 4, and in which the luminance in the wavelength range of from 430 to 550 nm is low as compared with these peak values. Furthermore, as light from such a light source passes in an optical device through various optical units, e.g., an optical filter and a polarizing lens, the energy of light in a short-wavelength region is absorbed by each unit and converted to heat, resulting in a decrease in luminance in the short-wavelength region. In particular, the peak luminance at around 430 nm decreases considerably. This decrease in the peak luminance at around 430 nm results in a relative increase in the peak luminance at around 550 nm, so that the image obtained has a yellowish tint.

Consequently, when the relationship R1>R2>70% can be satisfied, the problem of luminance decrease in a short-wavelength region caused by passing through optical units can be eliminated. A lens having this property is suitable for use as the projection lens of a projector or display which employs a light source having large luminance peaks at wavelengths of around 430 nm and around 550 nm and having a low luminance in the wavelength range of from 430 to 550 nm, like metal halide lamps and extra-high-pressure mercury lamps.

Although an average reflectance of 70% or higher generally suffices, the average reflectance is preferably 80% or higher, more preferably 85% or higher. In particular, the average reflectance R1 in the wavelength range of from 400 to 550 nm is preferably from 85 to 100%, while the average reflectance R2 in the wavelength range of from longer than 550 nm to 700 nm is preferably from 70 to 85%, the difference between R1 and R2 being preferably about from 3 to 30%.

EXAMPLES

The projection lens of the invention will be explained below in detail by means of Examples. Methods of measurement in the Examples are shown below.

(Degree of Crystallinity)

From infrared absorption peak values for a resin, the density of the amorphous part and the density of the crystalline part were estimated. The degree of crystallinity was determined from these density values (see *Porikâbonêto Handobukk,* 1st edition, p. 171, published by The Nikkan Kogyo Shinbun, Ltd.)

(Glass Transition Point (Tg))

Measured with a differential scanning calorimeter (DSC).

(Saturation Water Absorption)

Measured in accordance with ASTM D570.

(Viscosity-Average Molecular Weight)

A Ubbelohde capillary viscometer was used to measure the intrinsic viscosity [η] in methylene chloride at 20° C., and the viscosity-average molecular weight (Mv) was determined using the following equation.

$[\eta]=1.23\times10^{-4}\times(Mv)^{0.83}$ (Terminal OH Group Amount)

Colorimetric determination was made by the titanium tetrachloride/acetic acid method (*Makromol Chem,* 88, 215 (1965).

(Birefringence)

KOBRA-CCD/X, manufactured by Oji Scientific Instruments, was used to make a measurement with respect to each of partitioned cells about 300 μm square. The birefringence was evaluated based on the processing of these found values. The measurement was made under such conditions that the birefringent phase difference at a wavelength of 590 nm was measured throughout the whole optical functional surface.

(In a measurement of birefringent phase difference, when the surface has mars or minute irregularities, light is scattered and this may influence measurement results. It is therefore effective to take, for example, a measure in which the measurement is made after a refractive-index liquid regulated so as to have the same refractive index as the base and not attacking the base resin at ordinary temperature in a short time period is applied to the surface or after the base resin is immersed in the refractive-index-regulated liquid. In the case where the resin base has been colored with a dye or the like, it is effective to employ a method in which the wavelength to be used for the measurement of birefringent phase difference is shifted to a higher-transmittance region within the visible light region. When the base to be examined has a transmittance of about 10% or higher, a measurement may be possible with a birefringence meter of the type in which a base to be examined is disposed between two polarizers in a parallel nicol state and rotated and the birefringent phase difference is determined from the change in light transmittance resulting from the rotation. In the case where the base to be examined has a light transmittance lower than 10%, a base molded from the same material under the same conditions without using any colorant causative of coloration, such as a dye, pigment, or carbon black, is evaluated. Furthermore, in the case where the molded product has a vapor-deposited metal film, vapor-deposited dielectric film, or the like formed on the surface thereof, the film is removed by etching with an acid, alkali solution, or the like before evaluation.)

(Surface Roughnopess)

Measured with a surface roughness meter (Model SP-61, manufactured by Kosaka Laboratory) (magnification in measurement, 10 diameters; altitudinal magnification in measurement, 20,000 diameters).

(Reflectance)

Automatic recording spectrophotometer U-4000 (trade name), manufactured by Hitachi Ltd., was used with a 5° regular reflection attachment fitted thereto to measure the absolute reflectance by the V—N method.

(Method of Shape Measurement)

Noncontact three-coordinate measuring apparatus NH5 (manufactured by Mitakakohki Co., Ltd.) was used. The deviations in the Z-axis direction of the found data from the theoretical aspherical shape were taken as shape fluctuations.

Example 1

A mold having the structure shown in FIG. 1 and FIG. 2 was used to produce a projection lens. A polycarbonate resin produced by the interfacial polymerization method (Tg=150° C.; viscosity-average molecular weight, 20,000; OH group content, 180 ppm; saturation water absorption, 0.3 wt %) was used after drying. To this resin were added 400 ppm glycerol monostearate as a release agent and 300 ppm tris(2,4-di-tert-butylphenyl) phosphite (trade name: Ciba Specialty Chemicals IRGAFOS 168) as a heat stabilizer. Kneading with the additives was conducted by means of twin-screw kneader TEX 44 (trade name), manufactured by JSW, and the mixture was pelletized.

First, an aspherical mirror-surface mold die 1 (stamper) was produced which had a curved surface shown by the following equation (1) and had a plane projected size of 25 cm square with a base located at a distance of 40 mm from the center of the aspherical surface. This stamper had a surface roughness of from 40 Å to 80 Å throughout the surface. This stamper was tightly surrounded by a frame 3 so as to give a molded resin having an average thickness of just 10 mm. After the stamper and the frame were assembled together (hereinafter sometimes referred to as mold assembly), the resin pellets described above were placed in the frame (the area surrounded by the FIG. 3 and FIG. 1). A lid 4 was put on these in that state, and this mold was sandwiched between heaters 2 and 5 and between coolers 6 and 7. The resultant assembly was wholly put in a vacuum heating chamber 9, which was evacuated to −70 kPa. Thereafter, the heaters 2 and 5 were switched on and heated to 240° C. Subsequently, a load of 4.5 kPa was applied per area of the molded resin while maintaining the heated state. At 30 minutes after the switching on, the lower heater 2 and the upper heater 5 were set at 240° C. and 240° C., respectively, and held in this state for 30 minutes. Thereafter, the pressure inside the heating chamber 9 was returned to atmospheric pressure. In this state, while water was being passed for cooling through the coolers 6 and 7, the heaters 2 and 5 were held at 160° C. for 50 minutes, subsequently held at 140° C. for 30 minutes, and then held at 110° C. for 30 minutes to thereby cool the resin slowly. The rate of cooling at the time when the temperature passed through the Tg was calculated at 0.7° C./min. The temperature was lowered to 100° C. at a rate of 3° C./min. The vacuum heating chamber 9 was opened, and the mold assembly was taken out and disassembled into the frame 3 and the dies 1 and 4. The resin base 10 inside was taken out.

$$Z(h) = \frac{ch^2}{1 + \sqrt{1-(1+k)c^2h^2}} + Ah^4 + Bh^6 + Ch^8 + Dh^{10} \quad (1)$$

(c=1/r, c: curvature, r: radius, k: conical function, A, B, C, D: coefficient)

r=−160 k=−8.0

A=7.0E-9

B=−9.0E-14

C=6.5E-19

D=−2.0E-24

Figure 3:
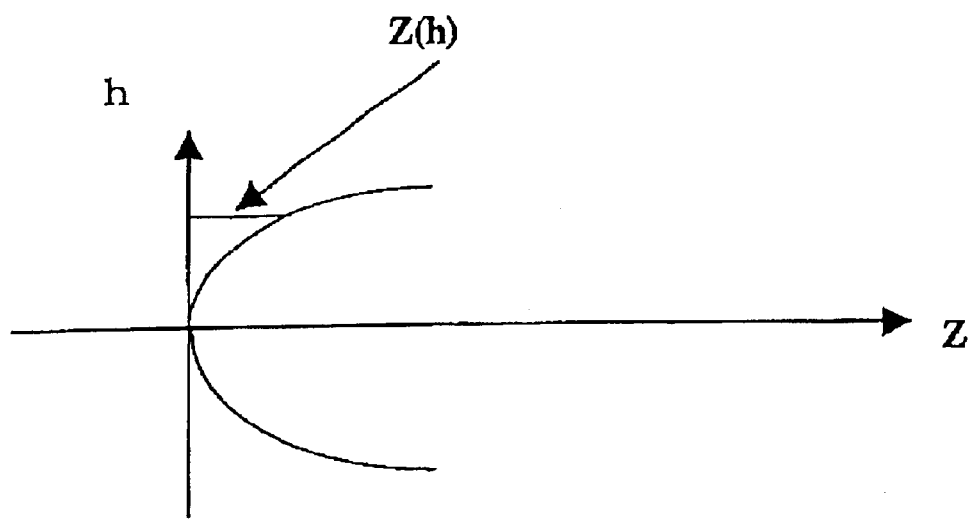
FIG. 3 is an illustration showing the coordinate determination made in Example 1.

The coordinate determination was as shown in FIG. 3.

The resin base in its area corresponding to the reflecting surface of the projection lens had an average thickness of 10 mm, maximum thickness of 12 mm, and minimum thickness of 8 mm. This resin base was examined for birefringence by the method described above. Prior to the measurement, a refractive-index-regulated liquid which had been regulated so as to have the same refractive index as the base was applied to the base surface while preventing bubble inclusion, in order to eliminate the influence of light scattering caused by fine irregularities and mars on the surface. The average of birefringent phase differences was 5 nm/mm in the region accounting for 75% of the optical functional surface and centering on the lowest area thereof. Furthermore, the surface roughness (Ra) of the base was measured and was found to be from 130 to 160 Å. A visual examination revealed that the surface state also was satisfactory. The shape fluctuations were in the range of from +30 μm to −70 μm.

The surface of the resin base obtained above was sufficiently cleaned with ethanol and then with warm water containing a surfactant. After this base was dried, Cr/AL/SiO$_x$ were vapor-deposited on the surface thereof in thicknesses of 100 Å/1,500 Å/400 Å.

Although reflectances of visible light are measured with a reflecting spectrophotometer, precise measurement is impossible on curved surfaces. Because of this, vapor-deposited layers having the same thicknesses were formed on a flat plate by the same process, and this reflecting film was examined. As a result, the reflectance thereof was 80% on the average. Furthermore, an image composed of 1,000,000 pixels was projected on the reflecting film and then projected on a screen of 100 cm by 76 cm obliquely from below the screen. As a result, a satisfactory image having no sensible distortion or deformation could be obtained. The projection magnification was about 20 diameters in terms of a real magnification.

The projection lens obtained can be suitably used in the optical system of a rear-projection television receiver or window display of the type in which images are projected obliquely from below the screen.

Example 2

A prepreg (which means a preform molded in plate form beforehand) having a thickness of 12 mm, width of 240 mm, and length of 240 mm) was used in place of the pellets in Example 1 to conduct molding in the same manner as in Example 1, except the following. After initiation of heating, the heater 2 and the heater 5 were held at 250° C. and 240° C., respectively, for about 30 minutes so that the lower heater 2 was regulated so as to have a temperature higher by about 10° C. than that of the upper heater 5. The heating time after pressure recovery was shortened by 10 minutes and the time period used for cooling to 160° C. was shortened by 10 minutes. As a result, a resin substrate equal to that of Example 1 was obtained. The resin base in its area corresponding to the reflecting surface of the projection lens had an average thickness of 10 mm, maximum thickness of 12 mm, and minimum thickness of 8 mm. The average of birefringent phase differences was 25 nm/mm in the region accounting for 75% of the optical functional surface and centering on the lowest area thereof. Furthermore, the surface roughness (Ra) of the base was measured and was found to be 150 Å. A visual examination revealed that the surface state also was satisfactory.

The surface of this resin base was sufficiently cleaned with ethanol and then with warm water containing a surfactant. After this base was dried, Cr/AL/SiO$_x$ were vapor-deposited on the surface thereof in thicknesses of 100 Å/1,500 Å/400 Å. Although reflectances of visible light are measured with a reflecting spectrophotometer, precise measurement is impossible on curved surfaces. Because of this, vapor-deposited layers having the same thicknesses were formed on a flat plate by the same process, and this reflecting film was examined. As a result, the reflectance thereof was 80% on the average. An image composed of 1,000,000 pixels was projected on this mirror and then projected on a screen of 100 cm by 76 cm obliquely from below the screen. As a result, a satisfactory image having no sensible distortion or deformation could be obtained. The projection magnification was about 20 diameters in terms of a real magnification.

Comparative Example 1

Pellets obtained by adding the same release agent and heat stabilizer as in Example 1 to a PMMA resin (Acrypet MD, manufactured by Mitsubishi Rayon Co., Ltd.; Tg=93° C.; saturation water absorption, 1.4 wt %) and kneading the mixture were used as a material. An injection mold was produced which had the same aspherical profile as in Example 1 and equipped with heating/cooling pipings. The pellets were set in 300-t injection compression molding machine FANUC ROBO SHOT i Series α-300iA, manufactured by FANUC Ltd. The resin was injected into the mold at a mold temperature of 80° C., injection temperature of 330° C., and injection pressure of 300 MPa, and the mold was held in this state for 20 minutes. Thereafter, the mold was opened and the resin base was taken out.

This resin base was examined for birefringent phase difference at a wavelength of 650 nm throughout the whole effective reflecting surface. Prior to the measurement, a refractive-index-regulated liquid which had been regulated so as to have the same refractive index as the base was applied to the base surface while preventing bubble inclusion, in order to eliminate the influence of light scattering caused by fine irregularities and mars on the surface. The average of birefringent phase differences was 40 nm/mm in the region accounting for 60% of the optical functional surface and centering on the lowest area thereof. The surface roughness (Ra) was 1,000 Å. The shape fluctuations were in the range of from +100 µm to −100 µm.

The aspherical surface of this resin base was sufficiently cleaned with ethanol and then with warm water containing a surfactant. After this base was dried, $Cr/AL/SiO_x$ were vapor-deposited on the surface thereof in thicknesses of 100 Å/1,500 Å/400 Å. The reflectance of visible light was 80% on the average. This mirror was held at 25° C. and 80 RH % for 48 hours. Thereafter, an image composed of 1,000,000 pixels was projected thereon and then projected on a screen of 100 cm by 76 cm obliquely from below the screen, in the same manner as in Example 1. As a result, image deformation and pixel shape deformation due to sink marks were observed in a central part. Furthermore, a deformed image in which left and right upper parts had sagged due to base warpage was observed.

Comparative Example 2

The same resin pellets and mold as in Comparative Example 1 were used. The resin was injected into the mold at a mold temperature of 200° C., injection temperature of 330° C., and injection pressure of 30 MPa. Thereafter, the mold was cooled at a rate of 1° C./min until the mold temperature reached 75° C. The mold was held at this temperature for 10 minutes and then opened, and the resin base was taken out.

This resin base was examined for birefringent phase difference at a wavelength of 590 nm throughout the whole effective reflecting surface. Birefringent phase differences were measured with KOBRA-CCD/X, manufactured by Oji Scientific Instruments, with respect to each of partitioned cells about 200 µm square, and evaluated based on the processing of these found values. Prior to the measurement, a refractive-index-regulated liquid which had been regulated so as to have the same refractive index as the base was applied to the base surface while preventing bubble inclusion, in order to eliminate the influence of light scattering caused by fine irregularities and mars on the surface. The average of birefringent phase differences was 60 nm/mm in the region accounting for 60% of the optical functional surface and centering on the lowest area thereof. The thickness of the resin base in its part corresponding to the reflecting surface of the projection lens was measured at 529 lattice points spaced at a distance of 1 cm. As a result of this measurement, the base was found to have an average thickness of 8 mm, maximum thickness of 13 mm, and minimum thickness of 5 mm.

The aspherical surface of this resin base was sufficiently cleaned with ethanol and then with warm water containing a surfactant. After this base was dried, $Cr/AL/SiO_x$ were vapor-deposited on the surface thereof in thicknesses of 200 Å/1,500 Å/400 Å. The reflectance of visible light was 80% on the average. The projection lens obtained was held at 25° C. and 40 RH % for 48 hours and then held in an atmosphere of 50° C. and 98 RH % for 6 hours. Thereafter, an image composed of 1,000,000 pixels was projected thereon and then projected on a screen of 100 cm by 76 cm obliquely from below the screen, in the same manner as in Example 1. As a result, a deformed image in which left and right upper parts had sagged was observed, because the molded product had expanded on its side opposite to the vapor-deposited film due to moisture absorption and had hence warped.

Example 3

A resin base obtained by the same method as in Example 1 was put in a drying oven and dried at 60° C. for 48 hours. Thereafter, a sputtering apparatus was used to deposit 200 Å-thick $SiO_2$ as an anchor coat, 1,500 Å-thick Al as a reflecting film, and 1,000 Å-thick $SiO_2$ as a protective film in this order on the optical functional surface of the resin base. Thus, a projection lens was obtained. Simultaneously with this film deposition, the same films were deposited also on a flat monitor glass having dimensions of 2.6 cm by 7.6 cm and a thickness of 1.3 mm. This coated glass was subjected to a reflectance measurement.

The monitor glass after the film deposition was examined for relative reflectance at a measuring angle of 5°, with the reflectance of an aluminum reference lens being taken as 100%. The coated monitor glass was found to have the following average reflectances.

Average reflectance R1 at wavelengths of from 400 to 550 nm: 98.1%

(Four measuring points: measuring wavelengths 400, 450, 500, and 550 nm)

Average reflectance R2 at wavelengths of from longer than 550 nm to 700 nm: 88.2%

(Three measuring points: wavelengths 600, 650, and 700 nm)

[Evaluation of Projection Lens for Relative Spectral Distribution]

Figure 5:
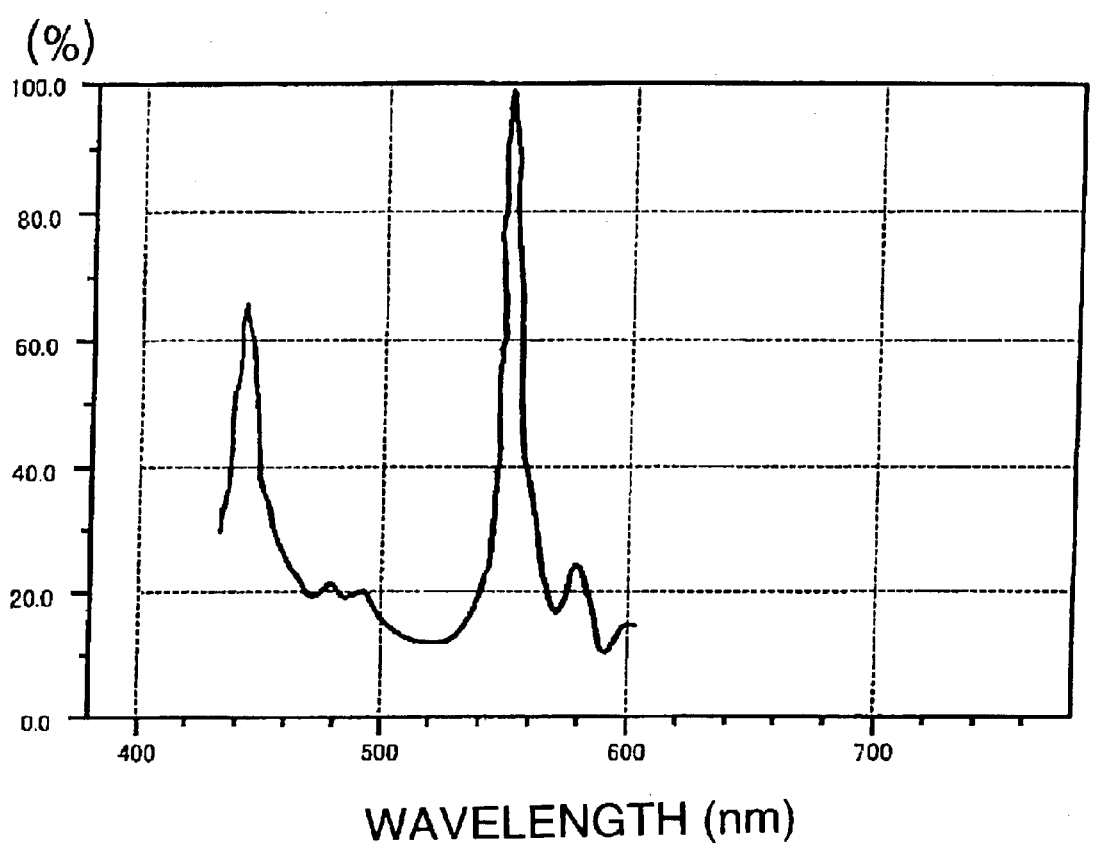
FIG. 5 is a graph showing a relative spectral distribution on a screen with the projection lens obtained in Example 3.

The projection lens obtained was examined for relative spectral distribution on a screen in the following manner. A white image emitted from a projector employing an extra-high-pressure mercury lamp was reflected on the projection mirror and projected on a glass screen. The luminance of this image in an area around the center was measured with spectral radiance meter CS-1000 (manufactured by Minolta Co., Ltd.). The results of the measurement were processed with data management software CS-S1W Ver. 2.0 (manufactured by Minolta Co., Ltd.) to obtain a relative spectral distribution. The relative spectral distribution obtained is as shown in FIG. 5.

In this relative spectral distribution, the value of the peak (P2) appearing at a wavelength of around 450 nm was used as an evaluation value, with the value of the peak (P1) appearing at a wavelength of around 550 nm being taken as 100. When that value exceeds 60, satisfactory images are obtained. As a result, P2 was about 62 when P1 was 100, and the white image on the screen had a reduced yellowish tint.
[Evaluation of Projection Lens in XYZ Color System Chromaticity Diagram]

The yellowness of the luminance obtained with the projection lens obtained was evaluated by means of the XYZ color system chromaticity diagram. As a result, x=0.2773 and y=0.3321, showing that the yellowness was little.

Example 4

A projection lens was produced in the same manner as in Example 1, except that the thickness of the protective film was changed to 800 Å. A monitor glass on which film deposition was conducted in the same manner as for this projection lens was found to have the following average reflectances.

Average reflectance R1 at wavelengths of from 400 to 550 nm: 94%

(Four measuring points: measuring wavelengths 400, 450, 500, and 550 nm)

Average reflectance R2 at wavelengths of from longer than 550 nm to 700 nm: 88.8%

(Three measuring points: wavelengths 600, 650, and 700 nm)

The projection lens obtained was examined for relative spectral distribution on a screen in the same manner as in Example 1. As a result, P2 was about 61 when P1 was 100, and the white image on the screen had a reduced yellowish tint. Furthermore, the values on coordinates X and Y in the XYZ color system chromaticity diagram were x=0.2793 and y=0.3337, showing that the yellowness was little.

Example 5

A projection lens was produced in the same manner as in Example 3, except that the protective film was not formed. A monitor glass on which film deposition was conducted in the same manner as for this projection lens was found to have the following average reflectances.

Average reflectance R1 at wavelengths of from 400 to 550 nm: 95.0%

(Four measuring points: measuring wavelengths 400, 450, 500, and 550 nm)

Average reflectance R2 at wavelengths of from longer than 550 nm to 700 nm: 95.1%

(Three measuring points: wavelengths 600, 650, and 700 nm)

The projection lens obtained was examined for relative spectral distribution on a screen in the same manner as in Example 3. As a result, P2 was 50 when P1 was 100, and the white image on the screen had a slight yellowish tint. Furthermore, the values on coordinates X and Y in the XYZ color system chromaticity diagram were x=0.2822 and y=0.3445, showing that the color was yellowish.

Example 6

A projection mirror was produced in the same manner as in Example 3, except that the thickness of the protective film was changed to 600 Å. A monitor glass on which film deposition was conducted in the same manner as for this projection lens was found to have the following average reflectances.

Average reflectance R1 at wavelengths of from 400 to 550 nm: 91.6%

(Four measuring points: measuring wavelengths 400, 450, 500, and 550 nm)

Average reflectance R2 at wavelengths of from longer than 550 nm to 700 nm: 92.3%

(Three measuring points: wavelengths 600, 650, and 700 nm)

The projection lens obtained was examined for relative spectral distribution on a screen in the same manner as in Example 3. As a result, P2 was about 59 when P1 was 100, and the white image on the screen had a slight yellowish tint. Furthermore, the values on coordinates X and Y in the XYZ color system chromaticity diagram were x=0.283 and y=0.3403, showing that the color was yellowish.

While the invention has been described in detail and with reference to specific embodiments thereof, it will be apparent to one skilled in the art that various changes and modifications can be made therein without departing from the spirit and scope thereof.

This application is based on a Japanese patent application filed on Oct. 20, 2000 (Patent Application 2000-321152), Japanese patent application filed on Oct. 31, 2000 (Patent Application 2000-333048), Japanese patent application filed on December 25, 2000 (Patent Application 2000-392419), and Japanese patent application filed on March 13, 2001 (Patent Application 2001-070629), the contents thereof being hereby incorporated by reference.

INDUSTRIAL APPLICABILITY

According to the invention, an aspherical projection lens is provided which is lightweight and inexpensive and, despite this, which is large and has a high-precision aspherical reflecting surface reduced in distortion. This projection lens can project high-resolution images free from distortion/deformation, especially when mounted in a projection device in which images are projected not from a direction perpendicular to the screen but from an oblique direction, in particular, obliquely from below the screen.

The projection lens of the invention is extensively applicable not only to rear-projector devices such as liquid-crystal rear projectors and DLP rear projectors, but also to devices necessitating a large aspherical mirror required to have a high-precision surface shape, such as, e.g., window displays. The projection lens is effective, for example, in reducing the thickness of rear-projection television receivers, enabling a front projector to be disposed near a presenter (heretofore, a projector should have been hung from the ceiling or installed high on a stepladder because of the necessity of projection perpendicular to the screen), or enabling a projector to be disposed in an inconspicuous place in winder displays or 3D displays.

What is claimed is:

1. A projection lens comprising a resin base having a given curved surface and a reflecting layer formed over the surface of the resin base, characterized in that the average of in-plane birefringent phase differences per unit thickness as measured with incident light from the direction perpendicular to the curved optical functional surface of the resin base is 30 nm/mm or less in a region accounting for at least 60% of the area of the optical functional surface, $$R1 > R2 \geq 70\%$$

wherein R1 is the average reflectance of light having wavelengths of from 400 to 550 nm on the reflecting surface and R2 is the average reflectance of light having wavelengths of from longer than 550 nm to 700 nm on the reflecting surface.

2. A projection lens having a reflecting layer on an optical-function-imparted surface, the projection lens comprising a resin base having a given curved surface and a reflecting layer formed over the surface of the resin base, wherein at least 60% of the optical-function-imparted surface has a surface roughness (Ra) of 200 Å or lower.

3. The projection lens of claim 1, which has a plane area of 150 cm² or larger, a minimum plane width of 10 cm or larger, and a thickness of 3 mm or larger.

4. The projection lens of claim 1, wherein the thickness of the resin base in its part corresponding to the optical functional surface of the projection lens is within ±50% based on the average thickness of the resin base.

5. The projection lens of claim 2, which satisfies $$R1 > R2 \geq 70\%$$

wherein R1 is the average reflectance of light having wavelengths of from 400 to 550 nm on the reflecting surface and R2 is the average reflectance of light having wavelengths of from longer than 550 nm to 700 nm on the reflecting surface.

6. The projection lens of claim 1, wherein the resin base comprises an amorphous thermoplastic resin.

7. The projection lens of claim 6, wherein the amorphous thermoplastic resin has a glass transition point of 80° C. or higher.

8. The projection lens of claim 6, wherein the amorphous thermoplastic resin has a saturation water absorption of 1% or lower as measured at 60° C. and 90 RH %.

9. The projection lens of claim 6, wherein the amorphous thermoplastic resin contains a release agent in an amount of from 30 to 3,000 ppm.

10. The projection lens of claim 6, wherein the amorphous thermoplastic resin is a polycarbonate resin.

11. The projection lens of claim 1, wherein the reflecting layer comprises a vapor-deposited aluminum film.

12. The projection lens of claim 11, which has, interposed between the resin base and the reflecting layer, an anchor coat layer comprising $SiO_x$, $Al_2O_3$, or Cr.

13. The projection lens of claim 12, wherein the reflecting layer has a transparent protective layer comprising a metal oxide film.

14. A resin base for projection lenses, characterized in that the average of in-plane birefringent phase differences per unit thickness as measured with incident light from the direction perpendicular to the curved optical functional surface of the resin base is 30 nm/mm or less in a region accounting for at least 60% of the area of the optical functional surface.

15. A process for producing the resin base for projection lenses of claim 14, characterized by keeping a feed resin in a pressed state between a mirror-surface die and a back-side die, heating the resin under reduced pressure to a temperature higher than the glass transition point (Tg) by from 50 to 120° C., elevating the pressure to around atmospheric pressure while maintaining the heated state, and then cooling the resin at a cooling rate lower than 30° C./min-mm per unit thickness of the resin base with respect to cooling in the range of from the temperature higher by 10° C. than the Tg to the temperature lower by 10° C. than the Tg.

16. The process for producing a resin base for projection lenses of claim 15, wherein a pressure of from 1 to 10,000 kPa is applied to the resin base in the period from after cooling initiation to cooling to Tg−10° C.

17. The projection lens of claim 2, which has a plane area of 150 cm² or larger, a minimum plane width of 10 cm or larger, and a thickness of 3 mm or larger.

18. The projection lens of claim 2, wherein the thickness of the resin base in its part corresponding to the optical functional surface of the projection lens is within ±50% based on the average thickness of the resin base.

19. The projection lens of claim 2, wherein the resin base comprises an amorphous thermoplastic resin.

20. The projection lens of claim 2, wherein the reflecting layer comprises a vapor-deposited aluminum film.

* * * * *